United States Patent
Kohl et al.

(10) Patent No.: US 8,660,873 B1
(45) Date of Patent: Feb. 25, 2014

(54) SUCCESSION PLANNING FOR REGISTERED INVESTMENT ADVISORS

(71) Applicant: FMR LLC, Boston, MA (US)

(72) Inventors: Waldemar Roy Kohl, Hampton, NH (US); Ashley Marie Reichert, Sutton, MA (US); Beverly Diana Flaxington, Walpole, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 14/020,237

(22) Filed: Sep. 6, 2013

Related U.S. Application Data

(63) Continuation of application No. 13/766,254, filed on Feb. 13, 2013, now Pat. No. 8,533,017.

(51) Int. Cl.
G06Q 40/00 (2012.01)
G06Q 10/06 (2012.01)

(52) U.S. Cl.
CPC .................... *G06Q 10/06395* (2013.01)
USPC .......... 705/7.11; 705/35; 705/36 R; 705/7.29

(58) Field of Classification Search
None
See application file for complete search history.

(56) References Cited

U.S. PATENT DOCUMENTS

| | | | |
|---|---|---|---|
| 5,819,263 A * | 10/1998 | Bromley et al. | 1/1 |
| 7,149,713 B2 * | 12/2006 | Bove et al. | 705/36 R |
| 7,321,870 B1 * | 1/2008 | Comiskey et al. | 705/36 R |
| 7,401,040 B2 * | 7/2008 | Sloan et al. | 705/36 R |
| 7,483,847 B1 * | 1/2009 | Rymer et al. | 705/35 |
| 7,657,498 B2 * | 2/2010 | Palaniappan | 706/50 |
| 7,689,494 B2 * | 3/2010 | Torre et al. | 705/36 R |
| 7,747,497 B1 * | 6/2010 | Rymer et al. | 705/35 |
| 7,844,523 B2 * | 11/2010 | Torre et al. | 705/35 |
| 7,925,565 B2 * | 4/2011 | Torre et al. | 705/36 R |
| 8,019,669 B1 * | 9/2011 | Rymer et al. | 705/35 |
| 8,126,768 B2 * | 2/2012 | Mehrotra et al. | 705/7.36 |
| 8,204,809 B1 * | 6/2012 | Wise | 705/35 |
| 8,311,863 B1 * | 11/2012 | Kemp | 705/7.11 |
| 8,311,864 B2 * | 11/2012 | Norelli | 705/7.11 |
| 8,515,848 B2 * | 8/2013 | Torre et al. | 705/36 R |
| 2002/0111890 A1 * | 8/2002 | Sloan et al. | 705/36 |
| 2004/0030566 A1 * | 2/2004 | Brooks Rix | 705/1 |
| 2005/0154658 A1 * | 7/2005 | Bove et al. | 705/35 |
| 2006/0229896 A1 * | 10/2006 | Rosen et al. | 705/1 |
| 2007/0038544 A1 * | 2/2007 | Snow et al. | 705/36 R |
| 2007/0061191 A1 * | 3/2007 | Mehrotra et al. | 705/11 |
| 2007/0233589 A1 * | 10/2007 | Vasinkevich | 705/36 R |

(Continued)

OTHER PUBLICATIONS

Weitzman, Jennifer. "Citi Private Bank to Customize Service on Web." American Banker. SourceMedia Inc. 2000.*

(Continued)

*Primary Examiner* — Gurkanwaljit Singh
(74) *Attorney, Agent, or Firm* — Proskauer Rose LLP

(57) ABSTRACT

Methods and apparatuses are described for determining a succession planning track for a registered investment advisor. A server generates a plurality of statements associated with business and personal goals, and each statement in the statement sets is associated with one or more succession planning tracks. The server determines one or more preliminary tracks based on selected statements received from the remote computing device. The server generates a set of business and personal value statements associated with the preliminary tracks. The server determines a final track based on a priority ranking for at least one of the business and personal value statements. The server generates a succession action plan corresponding to the final track.

13 Claims, 9 Drawing Sheets

(56) References Cited

U.S. PATENT DOCUMENTS

| | | | | |
|---|---|---|---|---|
| 2007/0244777 | A1* | 10/2007 | Torre et al. | 705/35 |
| 2008/0114704 | A1* | 5/2008 | Comiskey et al. | 705/36 R |
| 2008/0114715 | A1* | 5/2008 | Palaniappan | 706/60 |
| 2008/0147570 | A1* | 6/2008 | Torre et al. | 705/36 R |
| 2009/0098518 | A1* | 4/2009 | Morais | 434/236 |
| 2010/0057499 | A1* | 3/2010 | Fennelly | 705/4 |
| 2010/0114988 | A1* | 5/2010 | Linn et al. | 707/805 |
| 2010/0217652 | A1* | 8/2010 | Brooks Rix | 705/11 |
| 2010/0312603 | A1* | 12/2010 | Overman et al. | 705/9 |
| 2011/0196712 | A1* | 8/2011 | Norelli | 705/7.11 |
| 2013/0144671 | A1* | 6/2013 | Nega | 705/7.13 |
| 2013/0173494 | A1* | 7/2013 | Tayeb et al. | 705/36 R |

OTHER PUBLICATIONS

Editors, B. (Mar. 6, 2000). PNC advisors to use first rate performance to track after-tax and net-of-fees performance. Business Wire. Retrieved from http://search.proquest.com/docview/445819317?accountid=14753.*

Sycara, Katia, and Dajun Zeng. "Coordination of multiple intelligent software agents." International Journal of Cooperative Information Systems 5.02n03 (1996): 181-211.*

Rob Fanjogy, "New design software connects colleagues", from Professional Builder, Mar. 1, 1999.*

Kantrow, Y. D. (Jul. 15, 1997). Schwab capitalizes on referrals to fee-based advisers. American Banker. Retrieved from http://search.proquest.com/docview/249679771?accountid=14753.*

Prosci's Change Management Maturity Model Prosci © 2004.*

Clarke, Angela and Garside, John "The Development of a Best Practice Model for Change Management" European Management Journal vol. 15, No. S, pp. 537-545, 1997.*

Knodel, Ted "Preparing the Organizational 'Soil' for Measurable and Sustainable change: Business Value Management and Project Governance" Journal of Change Management, vol. 4, No. 1, 45-62, Mar. 2004 (Received Jun. 2003).*

Moffett et al. "Benchmarking and performance measurement: a statistical analysis" 2008Benchmarking v15n4 pp. 368-381.*

Amand et al "Benchmarking the benchmarking models" 2008 Benchmarking v15n3 pp. 257-291.*

Punniyamoorthy, et al "Balanced score for the balanced scorecard: a benchmarking tool" 2008Benchmarking v15n4 pp. 420-443.*

* cited by examiner

*We feel as though you still need more information.*
*Choose all that apply:*

Internal Transition:
- ☐ I have patience and confidence to mentor
- ☐ I have internal staff members who will be likely successors
- ☐ I have confidence in my ability to hire others and select a successor
- ☐ I am comfortable handing over the reins to another
- ☐ I am willing to invest several years preparing for the handoff
- ☐ It's important to keep the name, culture, etc., in place after my transition
- ☐ I am willing to work with someone side by side as I gradually transfer ownership
- ☐ I have capable and interested staff members who will want to buy the business
- ☐ I am prepared to forgo realization of full strategic fair market value in exchange for a more comfortable transition 502a

Merge & Stay Involved:
- ☐ I want to identify a like-minded advisor(s) to join forces
- ☐ I embrace a sharing of ideas
- ☐ I thrive in a team-based setting
- ☐ I am interested in realizing a portion of my firm equity now
- ☐ I am fully willing to work on merging cultures, staff, marketing, etc.
- ☐ I recognize that members of my team may be displaced in a merger
- ☐ I possess an understanding of the kind of firm or advisor that will be a good successor for me
- ☐ My interest is in continuing to work for the foreseeable future
- ☐ I can be patient in order to find the "right" fit in a partner firm
- ☐ I would be comfortable telling someone else's "story" in an advisory capacity
- ☐ I am willing to transition to new technologies with a new firm, if necessary Continue 502b

*Here is your Internal Transition readiness checklist.*
*Please choose all that apply:*

☐ My firm employs junior member(s) who are enthusiastic about the business and are committed to its future ☐ I am confident that currently employed staff members could become my successor(s)

☐ I have a mechanism in place for employees to share in firm profitability — one that motivates them to participate in growing the business ☐ I know the value of my firm ←——— 604b ☐ I've calculated how monetizing my business will allow me to achieve my needed replacement income ☐ I have an internal stock ownership plan in place and have a multiyear plan for employee buy-in ←——— 604a ☐ I am a good coach and mentor, and enjoy developing staff ☐ I know this approach is best for the firm's clients ☐ I am willing and able to finance the sale of my business, or have lined up external capital to finance the sale

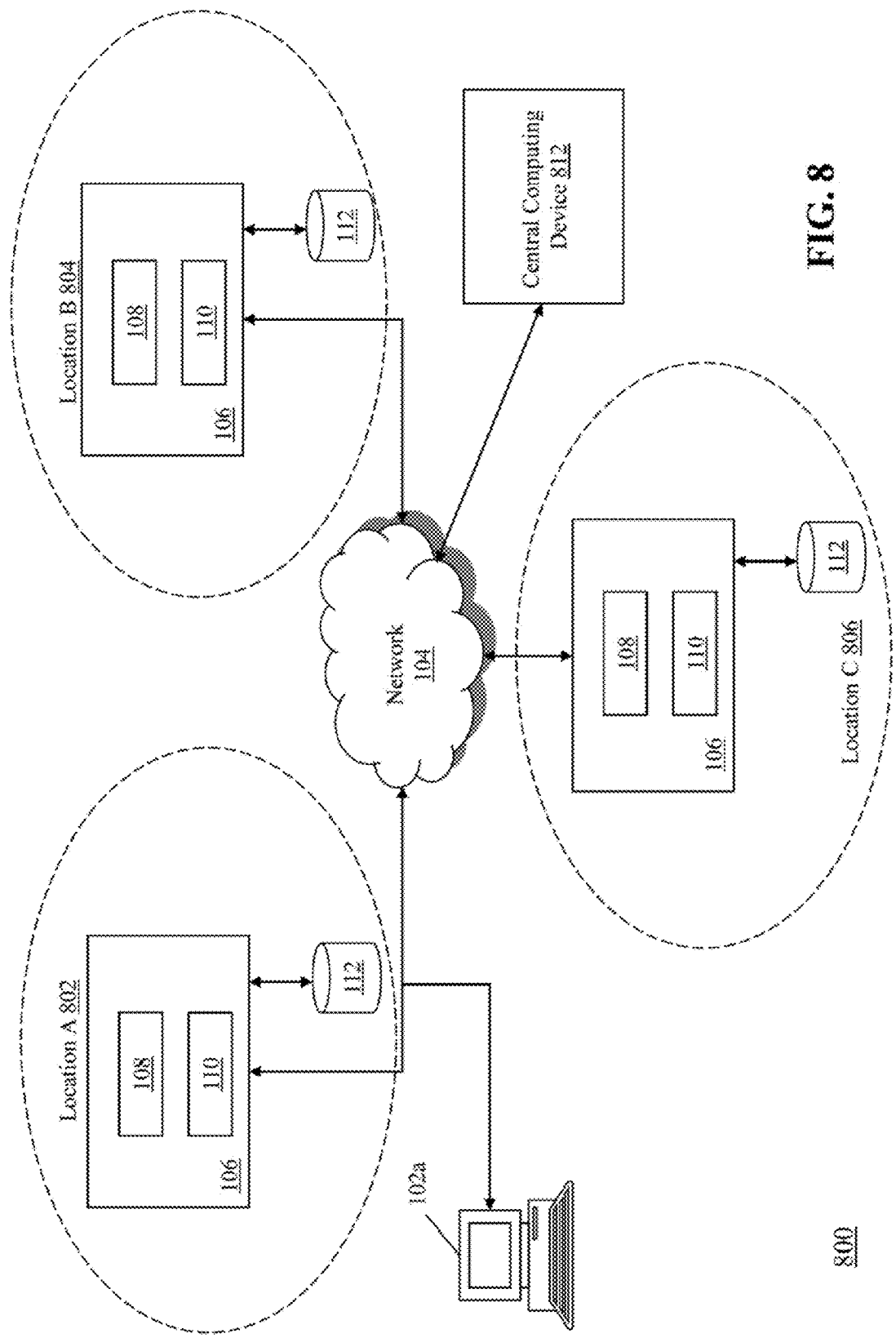

SUCCESSION PLANNING FOR REGISTERED INVESTMENT ADVISORS

RELATED APPLICATIONS

This application is a continuation of U.S. Ser. No. 13/766,254, filed on Feb. 13, 2013, the entirety of which is incorporated herein by reference.

FIELD OF THE INVENTION

This application relates generally to methods and apparatuses, including computer program products, for determining a succession planning track for a registered investment advisor.

BACKGROUND

Succession planning is quickly becoming one of the most significant areas of concern for many small business owners. Registered investment advisors (RIAs) face a unique challenge in this regard, as the industry is relatively new and many of today's practices are independent and first generation, with little-to-no experience or precedent in ownership transfer. Without an adequate succession plan in place, the RIAs' business equity and the security of his/her clients' portfolios are at risk.

Engaging independent advisors in a succession planning discussion is critical. Industry education on succession typically focuses on the mechanics (e.g., deal structures and multiples/valuation). What is missing, and what motivates behavior, is a business owner who can envision the end-state of his practice—the personal and professional goals and desires he or she wants to realize through succession.

SUMMARY OF THE INVENTION

Therefore, what is needed are methods and systems to assist RIAs in understanding and prioritizing personal and professional goals, obtaining a clear picture of succession planning options, identifying a succession planning track that matches the personal and professional goals, and developing an action plan based on the succession planning track. The techniques described herein provide an easy-to-use, interactive tool that helps advisors choose between competing objectives, prioritize personal goals, and identify critical elements to establish an action plan for succession readiness.

The invention, in one aspect, features a computerized method for determining a succession planning track for a registered investment advisor. A server computing device generates a plurality of statements associated with business and personal goals and transmits the statements to a remote computing device, where each statement is associated with one or more succession planning tracks. The server computing device determines one or more preliminary succession planning tracks based on selected statements received from the remote computing device. The server computing device generates a set of business and personal value statements associated with the preliminary succession planning tracks, and transmits the set of business and personal value statements to the remote computing device. The server computing device determines a final succession planning track based on a priority ranking for at least one of the business and personal value statements, where the priority ranking is received from the remote computing device. The server computing device generates a succession action plan corresponding to the final succession planning track, and transmits the succession action plan to the remote computing device.

The invention, in another aspect, features a computerized system for determining a succession planning track for a registered investment advisor. The system includes a server computing device with a processor configured to generate a plurality of statements associated with business and personal goals and transmit the statements to a remote computing device, where each statement is associated with one or more succession planning tracks. The processor is further configured to determine one or more preliminary succession planning tracks based on selected statements received from the remote computing device. The processor is further configured to generate a set of business and personal value statements associated with the preliminary succession planning tracks, and transmit the set of business and personal value statements to the remote computing device. The processor is further configured to determine a final succession planning track based on a priority ranking for at least one of the business and personal value statements, where the priority ranking is received from the remote computing device. The processor is further configured to generate a succession action plan corresponding to the final succession planning track, and transmits the succession action plan to the remote computing device.

The invention, in another aspect, features a computer program product, tangibly embodied in a non-transitory computer readable storage medium, for determining a succession planning track for a registered investment advisor. The computer program product includes instructions operable to cause a server computing device to generate a plurality of statements associated with business and personal goals and transmit the statements to a remote computing device, where each statement is associated with one or more succession planning tracks. The computer program product includes further instructions operable to cause the server computing device to determine one or more preliminary succession planning tracks based on selected statements received from the remote computing device. The computer program product includes further instructions operable to cause the server computing device to generate a set of business and personal value statements associated with the preliminary succession planning tracks, and transmit the set of business and personal value statements to the remote computing device. The computer program product includes further instructions operable to cause the server computing device to determine a final succession planning track based on a priority ranking for at least one of the business and personal value statements, where the priority ranking is received from the remote computing device. The computer program product includes further instructions operable to cause the data processing apparatus to generate a succession action plan corresponding to the final succession planning track, and transmits the succession action plan to the remote computing device.

Any of the above aspects can include one or more of the following features. In some embodiments, the step of determining one or more preliminary succession planning tracks comprises determining, by the server computing device, one or more succession planning tracks having the highest percentage of selected statements. In some embodiments, the step of determining a final succession planning track comprises determining, by the server computing device, one or more succession planning tracks associated with the value statements identified by the priority ranking.

In some embodiments, generating a succession action plan includes determining one or more succession planning services available to the registered investment advisor and relating to the action plan. In some embodiments, the priority ranking comprises a numeric value assigned to one of the value statements and represents the importance of the value statement to the registered investment advisor. In some embodiments, the response to each value statement in the checklist represents a 'yes' answer or a 'no' answer. In some embodiments, the one or more succession planning tracks include Merge & Stay Involved, Sell & Move On, and Internal Transition.

In some embodiments, the statements are displayed in a graphical user interface at the remote computing device. In some embodiments, the set of business and personal value statements is displayed in a graphical user interface at the remote computing device. In some embodiments, the remote computing device is associated with the registered investment advisor.

In some embodiments, the step of generating a succession action plan corresponding to the final succession planning track includes generating a readiness checklist based on the final succession planning track and transmitting the readiness checklist to the remote computing device, receiving a response to the readiness checklist from the remote computing device, and generating the succession action plan based on the response to the readiness checklist.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 5 is an exemplary user interface for displaying the checklist with the second set of business and personal value statements on the client device.

FIG. 6 is an exemplary user interface for displaying the readiness checklist on the client device.

FIG. 8 is a block diagram of a networked system for determining a succession planning track for a registered investment advisor.

DETAILED DESCRIPTION

Figure 1:
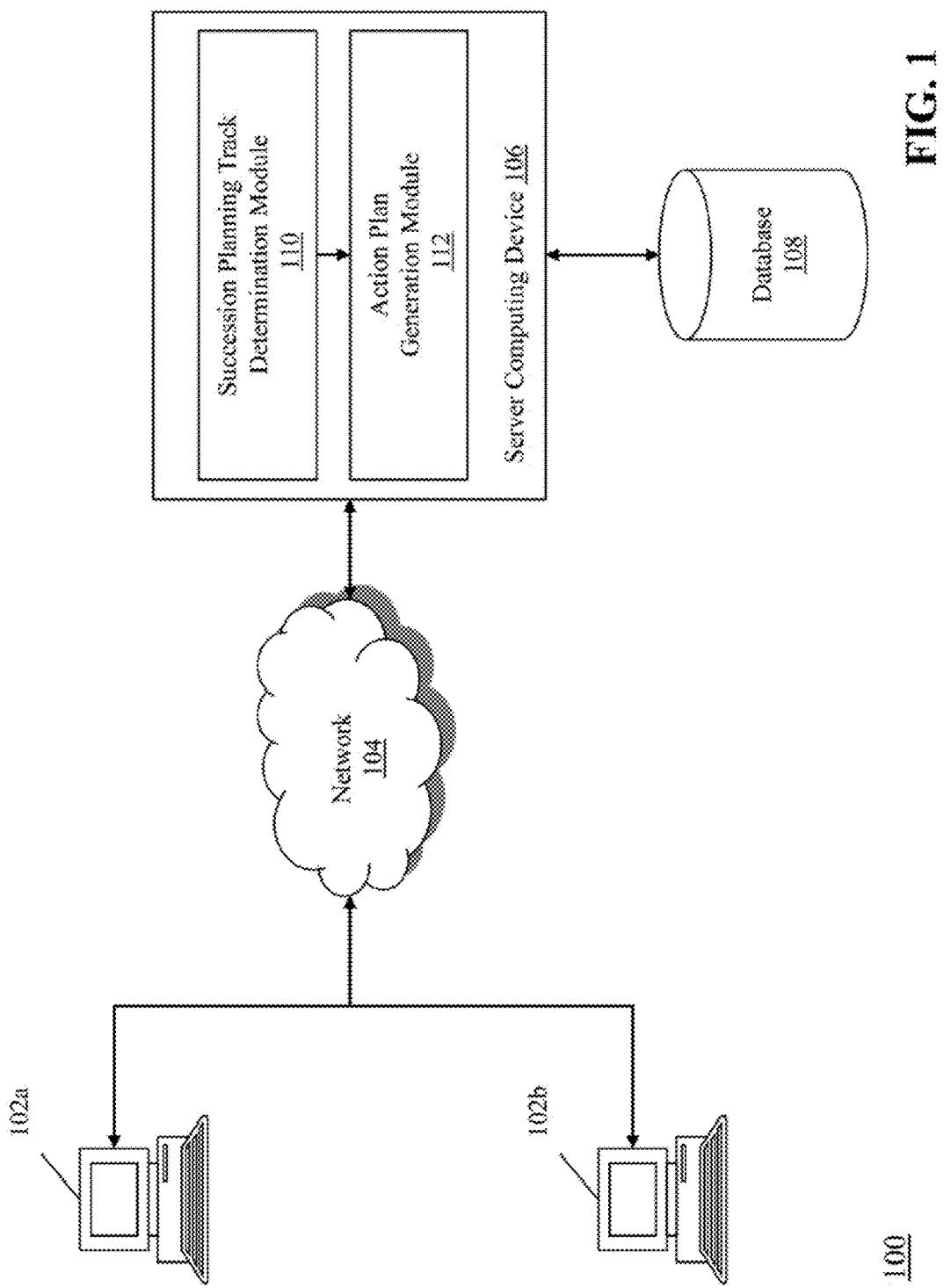
FIG. 1 is a block diagram of a system for determining a succession planning track for a registered investment advisor.

FIG. 1 is a block diagram of a system 100 for determining a succession planning track for a registered investment advisor. The system 100 includes client computing devices 102a-102b, communications network 104, server computing device 106, and database 108. The computing devices implement the computer processing in accordance with computer-implemented embodiments of the invention. The methods described herein may be achieved by implementing program procedures, modules and/or software executed on, for example, a processor-based computing devices or network of computing devices.

The client computing devices 102a-102b enable a user to connect to the server computing device 106 via the network 104 and access services provided by the server 106. Exemplary computing devices take on many forms, including but not limited to a personal computer, a tablet computer, a smart phone, an internet appliance, or the like. The client computing devices 102a-102b include network-interface components to enable the user to connect to a communications network 104, such as the Internet. The computing devices 102a-102b also include software (e.g., a web browsing application) to enable the user to navigate to an address associated with the server 106, view content received from the server 106, and provide input that is transmitted to the server 106.

The communications network 104 sends communications from the client computing devices 102a-102b to the server computing device 106 and back. The network 104 may be a local network, such as a LAN, or a wide area network, such as the Internet or the World Wide Web.

The server computing device 106 includes a succession planning track determination module 110 and an action plan generation module 112. The succession planning track determination module 110 and action plan generation module 112 are hardware and/or software modules located in the server computing device 106 and used to execute the method for determining a succession planning track for a registered investment advisor. In some embodiments, the server computing device 106 is coupled to other computing devices (not shown). In some embodiments, the functionality of the succession planning track determination module 110 and action plan generation module 112 is distributed among a plurality of computing devices. Additionally, in some embodiments, the database 108 is internally integrated into the server computing device 106. It should be appreciated that any number of computing devices, arranged in a variety of architectures, resources, and configurations (e.g., cluster computing, virtual computing, cloud computing) can be used without departing from the scope of the invention.

A user at a client computing device (e.g., device 102a) can interact with the system 100 by opening a Web browser on the client device 102a and entering the address of the server 106. The user can log in to the server 106 by providing credentials to the Web browser. The credentials can include, for example, one or more of the following: a username, user ID, password, personal identification number (PIN), certificate, pass code, encryption key, or other similar authentication data. For example, the server 106 receives a request from the client device 102a to access an application associated with succession planning track determination module 110 and action plan generation module 112, where the request contains the credentials. The server 106 authenticates the user by comparing the credentials in the request with pre-stored credential information. Once the server 106 authenticates the user, the server 106 enables the user to access the succession planning track determination module 110 and action plan generation module 112. The succession planning track determination module 110 and action plan generation module 112 can be elements of a web-based application, implemented using HTML, XML, JavaScript, or other similar software development platforms, that receives inputs from the client device 102a and processes the inputs in a fully automated manner to determine a succession action plan, according to the methods described herein. The succession planning track determination module 110 and action plan generation module 112 also generate user interface data as part of the action plan determination, and transmit a user interface based on the user interface data to the client device 102a for display to the user.

Figure 2A:
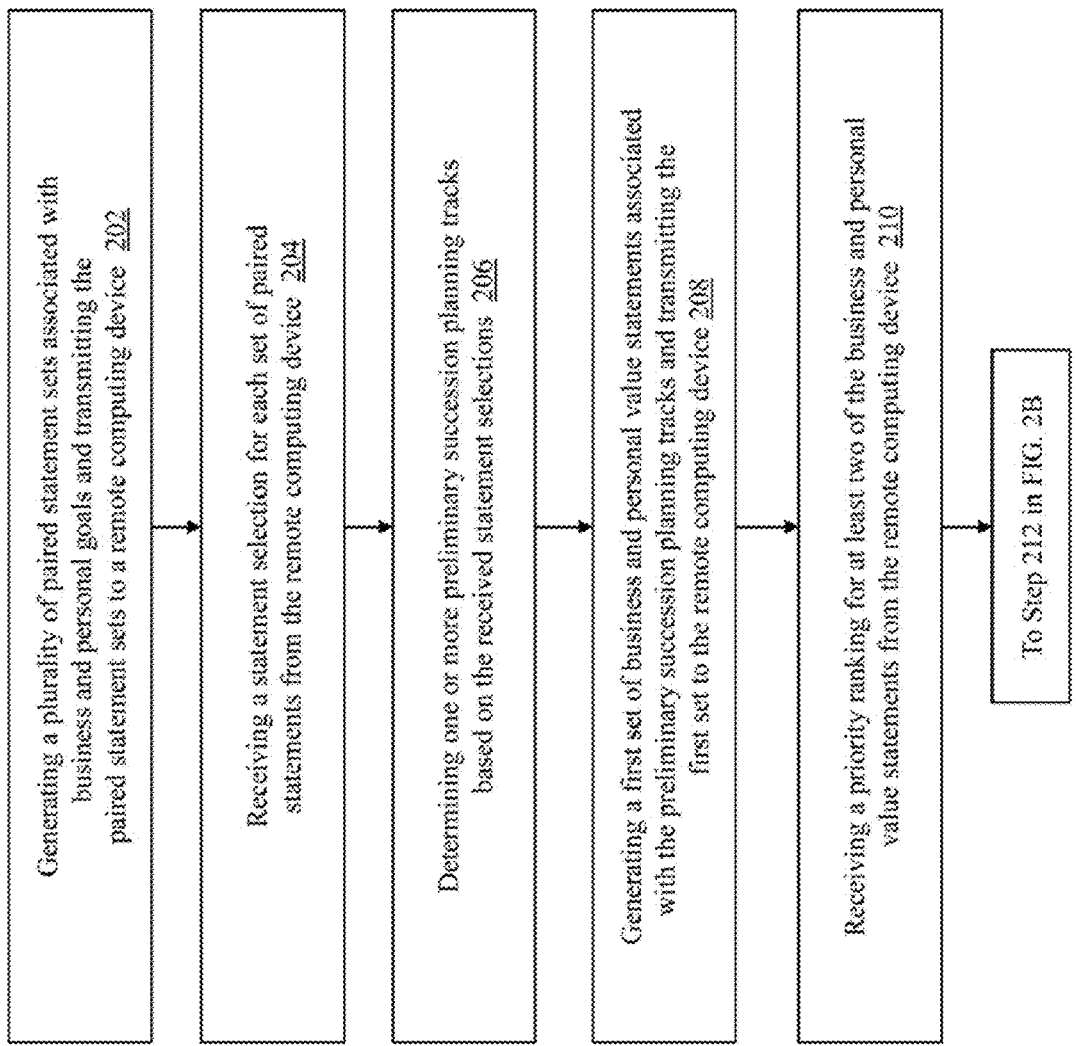
FIGS. 2A-2B are flow diagrams of a method for determining a succession planning track for a registered investment advisor.
Figure 2B:
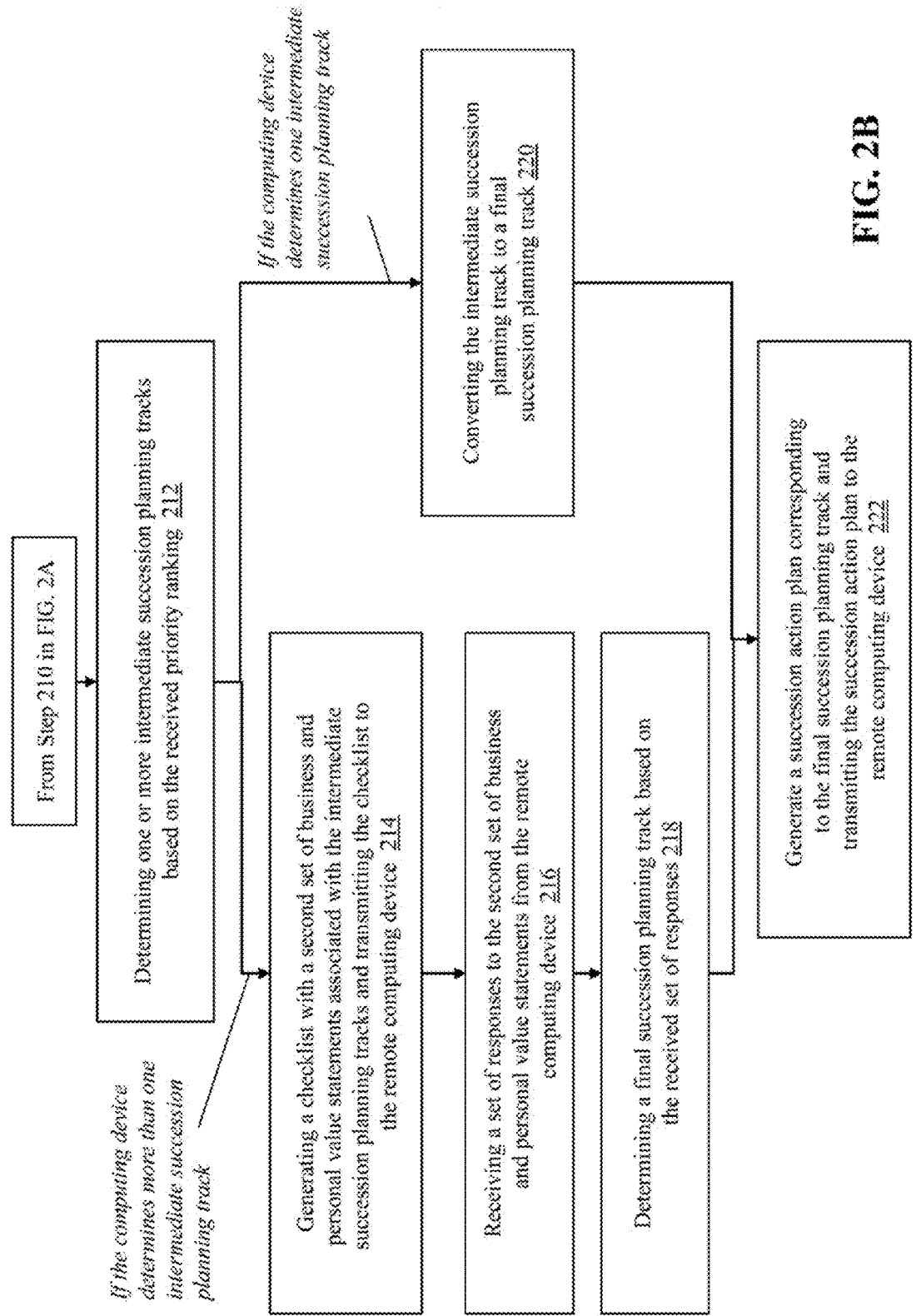

FIGS. 2A-2B are flow diagrams of a method 200 for determining a succession planning track for a registered investment advisor, using the system 100 of FIG. 1. The succession planning track determination module 110 of the server computing device 106 generates (202) a plurality of paired statement sets associated with business and personal goals and transmits the paired statement sets to a remote computing device (e.g., client device 102a). The paired statement sets are displayed to a user of the client device 102a in a graphical user interface configured to enable the user to select one statement from each of the paired sets.

Figure 3:
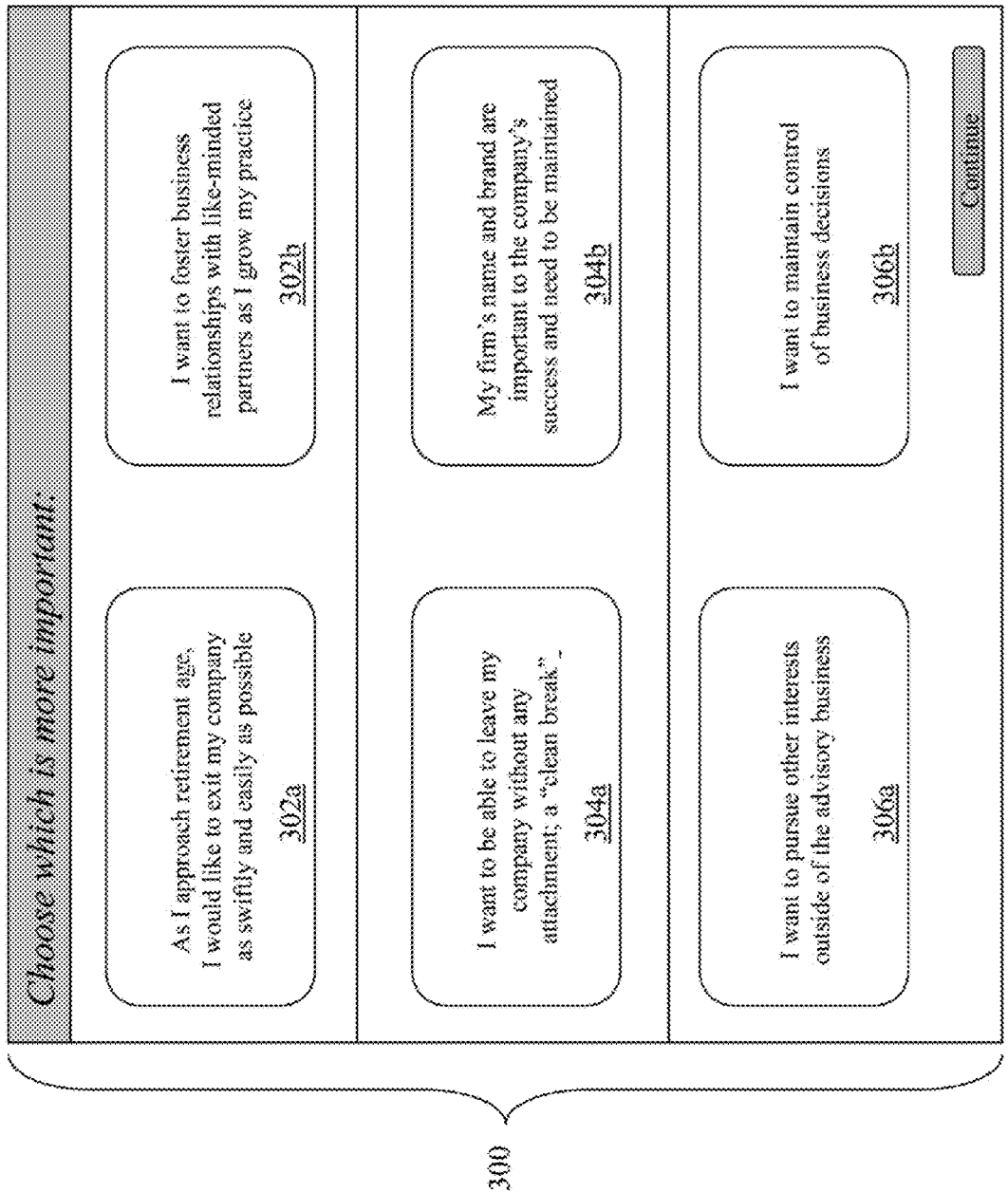
FIG. 3 is an exemplary user interface for displaying the plurality of paired statement sets on a client device.

FIG. 3 is an exemplary user interface 300 for displaying the plurality of paired statement sets on the client device 102a. The user interface 300 includes each of the paired statement sets (e.g., set 302a-302b, 304a-304b, and 306a-306b) in a tabular format, and each statement is associated with a user input mechanism that enables the user to select one statement or the other statement in each paired statement set. For example, as shown in FIG. 3, each statement (e.g., statement 302a) is positioned on a button and to select a statement, the user can click on the button to highlight the statement (e.g., the button appears pushed in or changes to a different color to indicate selection). Although FIG. 3 shows a plurality of paired statement sets on the same user interface screen, in some embodiments, each paired statement set can appear on a separate user interface screen. The user interface 300 can also include a continue button for the user to proceed to the next phase of succession planning track determination.

Each statement (e.g., statement 302a) that is included in the plurality of shared statement sets is associated with one or more succession planning tracks. A succession planning track is a roadmap for an RIA to position his or her advisory firm for the future while also achieving desired personal and/or business goals. One example of a succession planning track is "Merge & Stay Involved," which refers to the RIA merging his or her firm with another business while still maintaining a role with the firm and accommodating other business/personal goals. Another example of a succession planning track is "Sell & Move On," which refers to the RIA electing to exit the business altogether and transition his firm to a buyer. Another example of a succession planning track is "Internal Transition," which refers to the RIA choosing an individual from within the firm to succeed him or her as the owner/manager. The presentation of the plurality of paired statement sets allows the user to give consideration to important goals and priorities in their career as well as personal lives. Each set presents the user with two value statements from which the user chooses one or the other. Once the user has selected a statement from each of the paired statement sets, the client device 102a transmits the selections to the server 106.

The succession planning track determination module 110 receives (204) the statement selections for each set of paired statement sets from the client device 102a. The succession planning track determination module 110 determines (206) one or more preliminary succession planning tracks based on the received statement selections. As mentioned above, because each statement in the plurality of paired statement sets is associated with one or more succession planning tracks, the succession planning succession planning track determination module 110 can determine two preliminary tracks that align with the user's statement selections.

For example, the module 110 may generate ten paired statement sets for presentation on the client device 102a, resulting in a total of twenty statements. Of the twenty statements, seven are associated only with the Merge & Stay Involved track, six are associated only with the Sell & Move On track, six are associated only with the Internal Transition track, and one is associated with both the Sell & Move On track and the Internal Transition track. The user may select certain statements that result in the following breakdown of the user's selections:

| Transition Track | # Selected | Total of Each Track | Percentage Selected |
|---|---|---|---|
| Sell & Move On | 2.5 | 6.5 | 38% |
| Merge & Stay Involved | 3.5 | 7 | 50% |
| Internal Transition | 3 | 6.5 | 46% |

As shown in the table above, the user selected two statements associated only with the Sell & Move On track and one statement associated with the Sell & Move On track and another track, resulting in a score of 2.5. Because there are a total of 6.5 Sell & Move On statements overall, 38% (i.e., 2.5/6.5) of the user's selections are associated with the Sell & Move On track. Similarly, the user selected three statements associated only with the Merge & Stay Involved track and one statement associated with the Merge & Stay Involved track and another track. Because there are a total of 7 Merge & Stay Involved statements overall, 50% (i.e., 3.5/7) of the user's selections are associated with the Sell & Move On track. The same calculation is applied to the Internal Transition track, resulting in a selection percentage of 46%. Because the user's selections resulted in two tracks with similar selection percentages, the module 110 assigns the Merge & Stay Involved track and the Internal Transition track as the user's preliminary succession planning tracks.

Based on the determined preliminary succession planning tracks, the module 110 generates (208) a set of business and personal value statements associated with the preliminary tracks and transmits the set to the client device 102a. The set of business and personal value statements is displayed to a user of the client device 102a in a graphical user interface configured to enable the user to select one or more statements.

Figure 4:
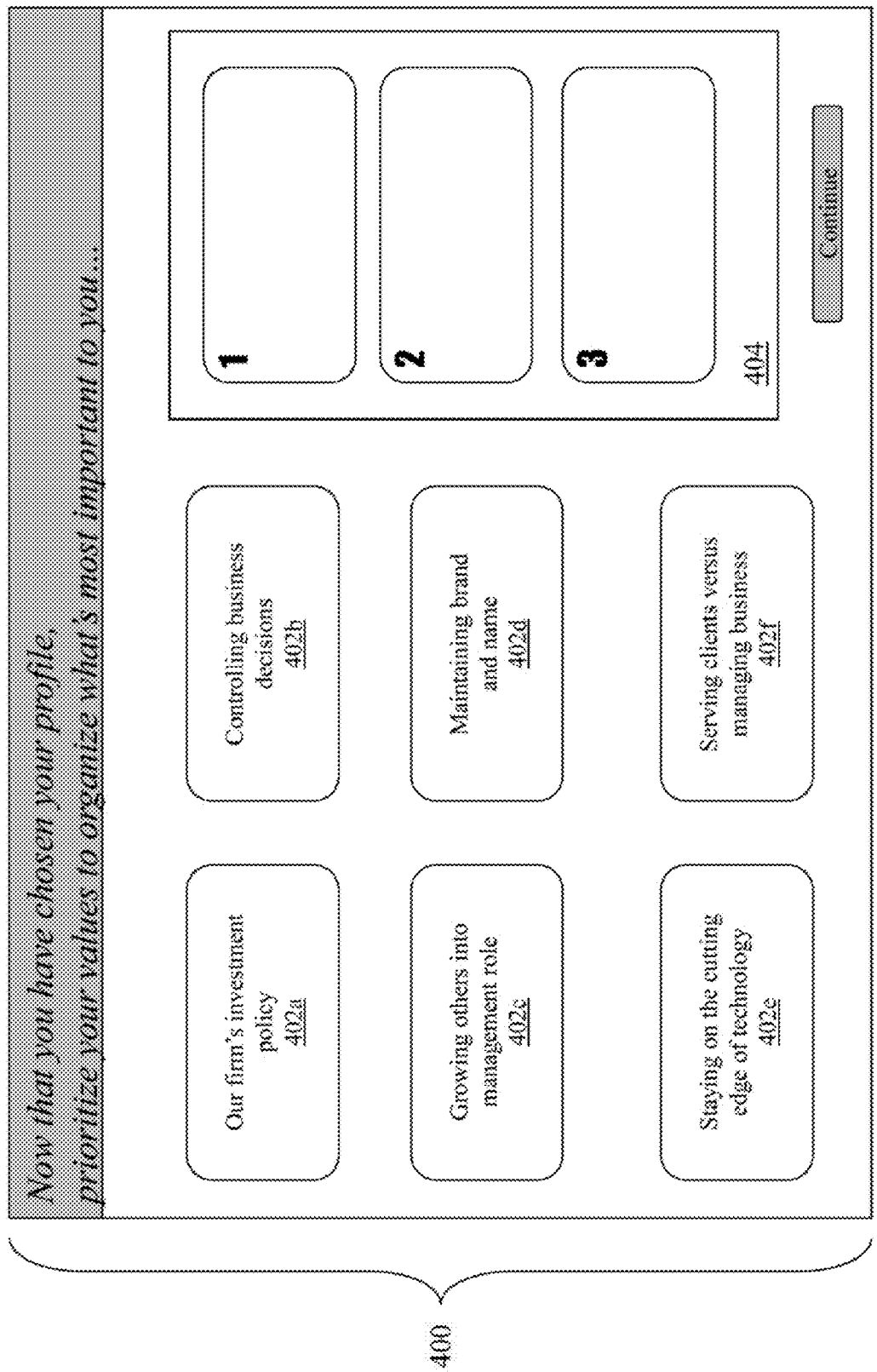
FIG. 4 is an exemplary user interface for displaying the set of business and personal value statements on a client device.

FIG. 4 is an exemplary user interface 400 for displaying the set of business and personal value statements on the client device 102a. The user interface 400 includes a plurality of business and personal value statements 402a-402f arranged in a list format. The business and personal value statements represent goals that the RIA would aim for when determining how to transition the firm to control by another person. Each of the business and personal value statements is also associated with one or both of the preliminary succession planning tracks identified by the module 110 during the previous phase. For example, as set forth previously, the server 106 had assigned the Merge & Stay Involved track and the Internal Transition track as the user's preliminary succession planning tracks. As a result, each of the business and personal value statements generated by the server is associated with either the Merge & Stay Involved track, the Internal Transition track, or both.

As shown in FIG. 4, a user at the client device 102a can select a value statement (e.g., statement 402a) that he or she feels is important to the future plan for the business by clicking the statement 402a and dragging the statement 402a to one of the numbered slots on the right-hand side (e.g., in area 404) of the interface 400. For example, if the user feels that the statement 402c—"Growing others into management role"—is an important when implementing a succession plan, then the user can drop statement 402a into the slot numbered "1" in area 404. Similarly, if the user feels that the statement 402e—"Staying on the cutting edge of technology"—is his or her third most important priority, then the user can drop statement 402e into the slot numbered "3" in area 404. Once the user has selected at least two statements and ranked them according to importance by placing the statements in the numbered slots, the user can click the Continue button to proceed to the next phase of the succession planning track determination.

The track determination module 110 receives (210) the priority ranking (e.g., statement 402a in the #1 slot, statement 402e in the #2 slot) for at least two of the business and personal value statements from the client device 102a. The module 110 determines (212) one or more intermediate succession planning tracks based on the received priority ranking, as described in greater detail below. Based on the user's selection and ranking of the business and personal value statements, the module 110 determines whether to assign one or more than one intermediate succession planning track.

Below is an exemplary breakdown of the selection of intermediate succession planning tracks based on the user's priority ranking:

| Value Statement | Transition Track | Rank |
| --- | --- | --- |
| Staying on the cutting edge of technology | Merge & Stay Involved | |
| Controlling business decisions | Merge & Stay Involved/ Internal Transition | 1 |
| Our firm's investment policy | Merge & Stay Involved/ Internal Transition | |
| Serving clients versus managing business | Merge & Stay Involved/ Internal Transition | 3 |
| Maintaining brand and name | Internal Transition | 2 |
| Growing others into management role | Merge & Stay Involved/ Internal Transition | |

As shown above, the user selected two value statements associated with both the Merge & Stay Involved track and the Internal Transition track, and one value statement associated with only the Internal Transition track. Because each value statement can be associated with up to two succession planning tracks, there are a total of six points to be assigned across the three selected statements. Based on the above selections, the Internal Transition track is assigned a score of four out of six (i.e., one point for the rank 1 statement; two points for the rank 2 statement, and one point for the rank 3 statement) and the Merge & Stay Involved track is assigned a score of two out of six (i.e., one point for each of the rank 1 and rank 3 statements). As a result, the Internal Transition track is determined to be the primary intermediate succession planning track and the Merge & Stay Involved track is determined to be the secondary intermediate succession planning track. In the above example, each value statement is accorded equal weight (or points) when determining the intermediate succession planning track(s).

In some examples, the user's selections may result in the determination of only one intermediate succession planning track. For example, if the user has selected three business and personal value statements that are all associated with only the Sell & Move On track, the track determination module 110 assigns only the Sell & Move On track as the user's intermediate succession planning track.

If the module 110 determines that more than one intermediate succession planning track is applicable based on the user's priority ranking, the module 110 generates (214) a checklist with a second set of business and personal value statements associated with the intermediate succession planning tracks and transmits the checklist to the client device 102a. The user's responses to the checklist enables the module 110 to determine a single final succession planning track that is the most aligned with the user's objectives and goals for his or her business in the future.

FIG. 5 is an exemplary user interface 500 for displaying the checklist with the second set of business and personal value statements on the client device 102a. The user interface 500 includes a checklist 502a having statements aligned with the Internal Transition track, and a checklist 502b having statements aligned with the Merge & Stay Involved track. The user can select one or more statements, up to the total number of statements minus one, that he or she feels are important values and are applicable to the user's vision for the future of his or her RIA business. The limitation on the number of statements that can be selected ensures that the user's selections do not result in a tie between two succession planning tracks. Each statement has a corresponding checkbox that the user can click in order to select a statement. In some embodiments, the checkboxes can be replaced with other types of user input devices (e.g., radio buttons, yes/no drop down lists, text boxes). The user can then click the Continue button once he or she has finished selecting any applicable statements.

The track determination module 110 receives (216) the set of responses to the second set of business and personal value statements in the checklist. The module 110 determines (218) a final succession planning track based on the received set of responses. For example, as shown in FIG. 5, the Internal Transition checklist 502a has nine statements in total, while the Merge & Stay Involved checklist 502b has eleven statements in total. One example might be that the user selects seven statements in the Internal Transition checklist 502a and two statements in the Merge & Stay Involved checklist 502b. The module 110 can determine which succession planning track should be the final track by calculating a score for each checklist 502a-502b that is weighted according to the number of statements in each checklist 502a-502b (i.e., because there are nine statements in the Internal Transition checklist 502a, the weight for each question would be 1/9 or 0.111). Continuing with the above example, the score for the Internal Transition checklist 502a is the total number of selected statements (i.e., seven) multiplied by the weight (0.111)—or a score of 0.777. The score for the Merge & Stay Involved checklist 502b is the total number of selected statements (i.e., two) multiplied by the weight (1/11 or 0.0909)—or a score of 0.1818.

Because the score for the Internal Transition checklist 502a is greater than the score for the Merge & Stay Involved checklist 502b, the track determination module 110 determines that the Internal Transition track is the succession planning track most closely aligned with the user's stated goals, values, and preferences. The module 110 then assigns the Internal Transition track as the final succession planning track for the user.

The action plan generation module 112 receives the final succession planning track from the track determination module 110 and generates (222) a succession action plan corresponding to the final succession planning track and transmits the succession action plan to the client device 102a. In some embodiments, the action plan generation module 112 generates a readiness checklist to garner additional information from the RIA and identify areas of concern (or lack of readiness) that the succession action plan can be tailored to address.

FIG. 6 is an exemplary user interface 600 for displaying a readiness checklist on the client device 102a. The user interface 600 includes a checklist 602 of statements relating to certain tasks that the user may have completed or addressed previously. The user can select one or more statements pertaining to completed tasks and click the Continue button to transmit the responses to the action plan generation module 112. The module 112 can analyze the responses and, during generation of the succession action plan, tailor the items included in the action plan based on the responses. For example, the module 112 may remove an action item from the action plan relating to internal stock ownership plan formation if the user has selected the corresponding statement on the readiness checklist 602. In another example, the module 112 may add an action item to the action plan relating to firm valuation if the user has not selected the corresponding statement 604b on the readiness checklist 602.

In some embodiments, each statement in the readiness checklist 602 can be associated with a user input mechanism that allows the user to provide a more detailed response. For example, the user input mechanism can be a radio button having three options: Green, Yellow, and Red—where Green indicates that the user fully agrees with the statement, Yellow indicates the user somewhat agrees with the statement, and Red indicates that the user does not agree with the statement. Other types of user input mechanisms (e.g., sliders, scales) can be implemented without departing from the scope of the invention described herein.

Also, as described above, the user's previous selections for the first set of business and personal value statements (i.e., the priority ranking) may result in the determination of only one intermediate succession planning track. Referring back to FIG. 2B, if the track determination module 110 determines only one intermediate succession planning track, the module 110 converts (220) the intermediate succession planning track to a final succession planning track. In this case, the module 110 does not need to generate a checklist with a second set of business and personal value statements. Instead, the module 112 can proceed to generate (222) a succession action plan corresponding to the final succession planning track and transmit the succession action plan to the client device 102a.

Figure 7:
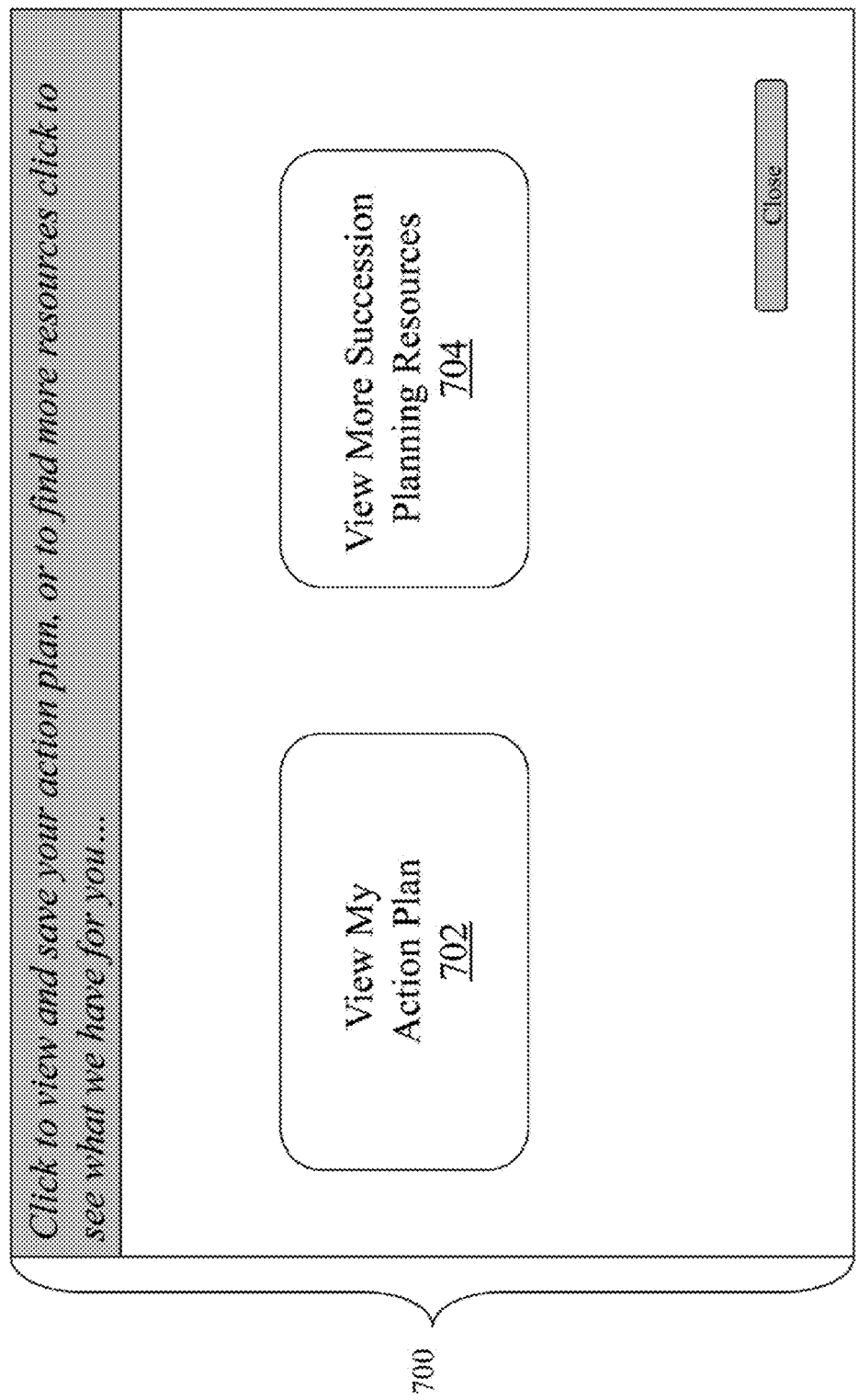
FIG. 7 is an exemplary user interface for providing the action plan and additional resources.

Once the action plan is generated, the server 106 can transmit information to the client device 102a to enable the user to access the generated action plan as well as additional resources relating to succession planning. In some embodiments, the server 106 uses the final succession planning track to select additional resources that are applicable to the final track and eliminates other resources that are not related to the final track. FIG. 7 is an exemplary user interface 700 for providing the action plan and additional resources to the user. The user interface 700 includes a button 702 to allow the user to view and save his or her action plan. For example, the server 106 can transmit an electronic document containing the action plan for display on the client device 102a in any number of commonly-used formats (e.g., Word, PDF). The server 106 can also transmit the action plan to the user via email or other similar communications methods. The user interface also includes a button 704 to allow the user to view additional succession planning resources, such as contact information for a succession planning advisor, links to web sites with more information on succession planning, informational videos on the succession planning process, and the like. The user can click the Close button to exit the succession planning application.

The techniques may be implemented in a networked system 800 comprising multiple computing devices distributed across different locations, as shown in FIG. 8. Each of Location A 802, Location B 804 and Location C 806 includes the server computing device 106 having components 108, 110, 112 of FIG. 1, and the servers at locations 202, 204, and 206 are connected to each other via the network 104. The networked system of FIG. 8 enables distribution of the processing functions described herein across several computing devices and provides redundancy in the event that a computing device at one location is offline or inoperable. In some embodiments, client computing devices (e.g., device 102a) in proximity to a particular location (e.g., Location A 802) access the networked system via the server 106 at that location. In some embodiments, the server computing devices 106 at the respective locations 802, 804, 806 communicate with a central computing device 812 (e.g., a server) that is coupled to the network. The central computing device 812 can provide data and/or processing resources for the network of computing devices 106 (e.g., synchronization of functionality/data across the computing devices).

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices;

magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A computerized method for determining a succession planning track for a registered investment advisor, the method comprising:

generating, at a server computing device, a plurality of statements associated with business and personal goals and transmitting the statements to a remote computing device, wherein each statement is associated with one or more succession planning tracks;

determining, by the server computing device, one or more preliminary succession planning tracks based on selected statements received from the remote computing device;

generating, by the server computing device, a set of business and personal value statements associated with the preliminary succession planning tracks and transmitting the set of business and personal value statements to the remote computing device;

determining, by the server computing device, a final succession planning track based on a priority ranking for at least one of the business and personal value statements, the priority ranking received from the remote computing device; and generating, by the server computing device, a succession action plan corresponding to the final succession planning track and transmitting the succession action plan to the remote computing device.

2. The method of claim 1, wherein the step of determining one or more preliminary succession planning tracks comprises determining, by the server computing device, one or more succession planning tracks having the highest percentage of selected statements.

3. The method of claim 1, wherein the step of determining a final succession planning track comprises determining, by the server computing device, one or more succession planning tracks associated with the value statements identified by the priority ranking.

4. The method of claim 1, wherein generating a succession action plan includes determining one or more succession planning services available to the registered investment advisor and relating to the action plan.

5. The method of claim 1, wherein the priority ranking comprises a numeric value assigned to one of the value statements and represents the importance of the value statement to the registered investment advisor.

6. The method of claim 1, wherein the response to each value statement in the checklist represents a 'yes' answer or a 'no' answer.

7. The method of claim 1, wherein the one or more succession planning tracks include Merge & Stay Involved, Sell & Move On, and Internal Transition.

8. The method of claim 1, wherein the statements are displayed in a graphical user interface at the remote computing device.

9. The method of claim 1, wherein the set of business and personal value statements is displayed in a graphical user interface at the remote computing device.

10. The method of claim 1, wherein the remote computing device is associated with the registered investment advisor.

11. The method of claim 1, wherein the step of generating a succession action plan corresponding to the final succession planning track includes:
- generating a readiness checklist based on the final succession planning track and transmitting the readiness checklist to the remote computing device;
- receiving a response to the readiness checklist from the remote computing device; and
- generating the succession action plan based on the response to the readiness checklist.

12. A computerized system for determining a succession planning track for a registered investment advisor, the system comprising a server computing device having a processor configured to:
- generate a plurality of statements associated with business and personal goals and transmit the statements to a remote computing device, wherein each statement is associated with one or more succession planning tracks;
- determine one or more preliminary succession planning tracks based on selected statements received from the remote computing device;
- generate a set of business and personal value statements associated with the preliminary succession planning tracks and transmit the set of business and personal value statements to the remote computing device;
- determine a final succession planning track based on a priority ranking for at least one of the business and personal value statements, the priority ranking received from the remote computing device; and
- generate a succession action plan corresponding to the final succession planning track and transmitting the succession action plan to the remote computing device.

13. A computer program product, tangibly embodied in a non-transitory computer readable storage medium, for determining a succession planning track for a registered investment advisor, the computer program product including instructions operable to cause a server computing device to:
- generate a plurality of statements associated with business and personal goals and transmit the statements to a remote computing device, wherein each statement is associated with one or more succession planning tracks;
- determine one or more preliminary succession planning tracks based on selected statements received from the remote computing device;
- generate a set of business and personal value statements associated with the preliminary succession planning tracks and transmit the set of business and personal value statements to the remote computing device;
- determine one or more intermediate succession planning tracks based on a priority ranking for at least one of the business and personal value statements, the priority ranking received from the remote computing device; and
- generate a succession action plan corresponding to the final succession planning track and transmitting the succession action plan to the remote computing device.

* * * * *